United States Patent [19]

Aldridge et al.

[11] Patent Number: 5,098,241
[45] Date of Patent: Mar. 24, 1992

[54] VARIABLE LENGTH TELESCOPIC CONNECTOR AND METHOD FOR USE

[75] Inventors: James H. Aldridge, Battle Creek, Mich.; Melvin L. Witter, Dallas, Tex.

[73] Assignee: XYZYX International Corp., Dallas, Tex.

[21] Appl. No.: 650,486

[22] Filed: Feb. 5, 1991

[51] Int. Cl.⁵ .................. F16B 37/08; F16B 7/10; L16L 35/00; L16L 37/00
[52] U.S. Cl. .................. 411/433; 411/353; 411/437; 411/438; 285/34; 285/321; 403/104; 403/109
[58] Field of Search ........... 411/352, 353, 265–267, 411/270, 432, 433, 437, 438; 285/34, 35, 321; 403/104, 105, 110, 118; 292/256.6, 256.65

[56] References Cited

U.S. PATENT DOCUMENTS

| | | |
|---|---|---|
| 2,388,056 | 10/1945 | Hendricks ............ 403/105 |
| 3,151,891 | 10/1964 | Sanders . |
| 3,314,696 | 4/1967 | Ferguson et al. . |
| 3,534,988 | 10/1970 | Lindsey . |
| 4,087,120 | 5/1978 | Rumble . |
| 4,378,187 | 3/1983 | Fullerton ............. 411/433 |
| 4,635,974 | 1/1987 | Moussaian . |
| 4,657,425 | 4/1987 | Takahashi ............. 403/104 |
| 4,783,100 | 11/1988 | Klein . |
| 4,802,700 | 2/1989 | Stevenson et al. ....... 411/353 |
| 4,805,943 | 2/1989 | Balsells . |
| 4,813,716 | 3/1989 | Lalikos et al. . |
| 4,906,031 | 3/1990 | Vyse . |
| 5,002,318 | 3/1991 | Witter . |

FOREIGN PATENT DOCUMENTS

| | | |
|---|---|---|
| 0014094 | 6/1980 | European Pat. Off. . |
| 1945627 | 3/1970 | Fed. Rep. of Germany ....... 285/34 |

Primary Examiner—Neill R. Wilson
Attorney, Agent, or Firm—Brooks & Kushman

[57] ABSTRACT

A telescopic connector which may be varied in length and a method for installing the connector is disclosed. The connector includes telescoping male and female members which are joined by the action of a spring, which functions as a lockring, positioned in recesses in the two members. The spring possesses at least one release finger at one of its ends, the release fingers extending through an opening in the female member. The recess in the female member includes a shoulder portion and at least one cam surface. The recess on the male member may be either a recess comprising a shoulder portion and cam surface or a recess created between threads on the outer periphery of the male member. The cam surfaces restrict movement between the telescoping members until such time as the release fingers are manipulated to expand the spring, causing the spring to position within the shoulder of the female member, providing clearance between the spring and the male member which allows for two-way movement. Also, the spring may cooperate with the threaded periphery on the male member for threaded engagement and helical movement, relative to the male member.

16 Claims, 3 Drawing Sheets

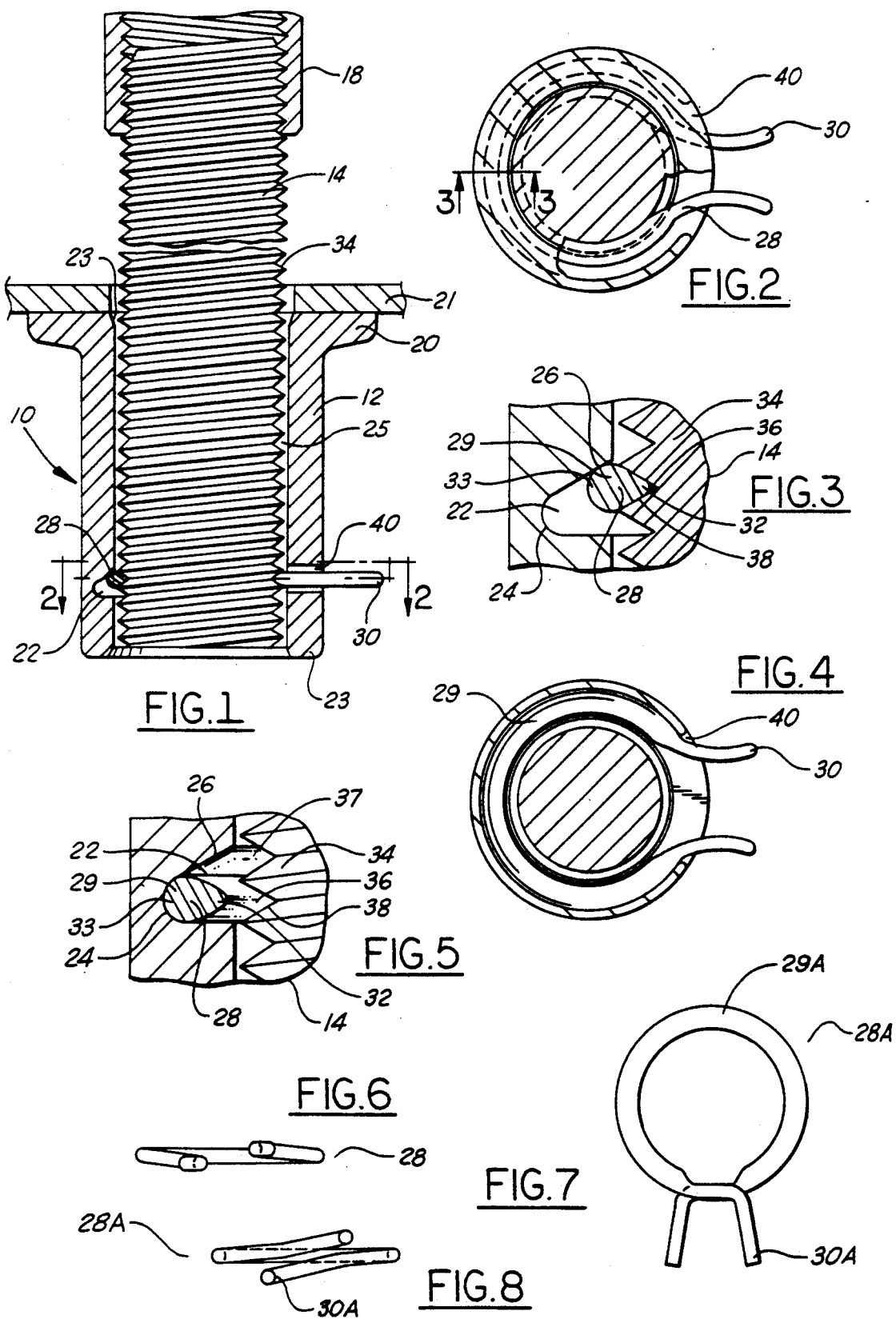

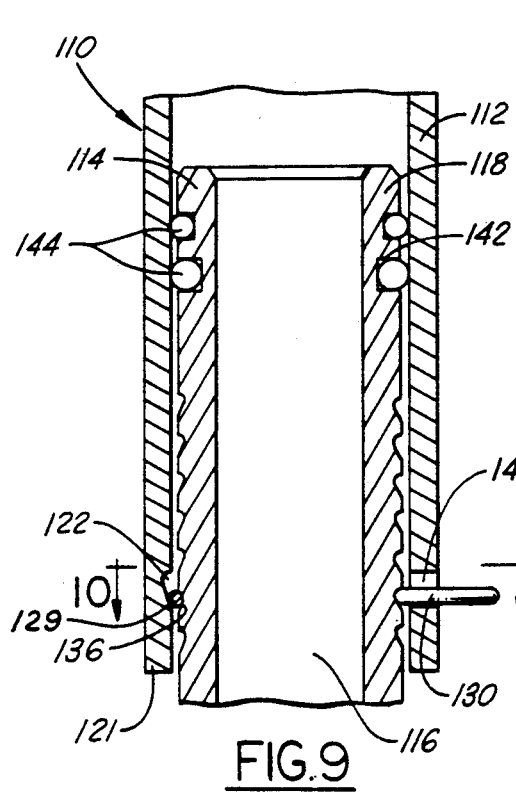
FIG. 9
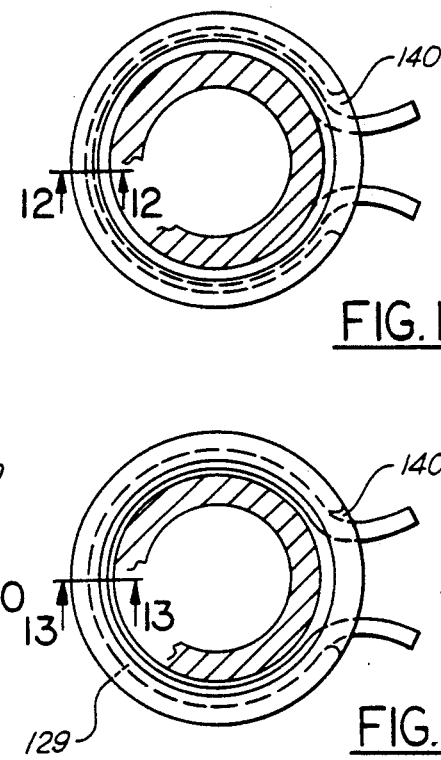
FIG. 10
FIG. 11
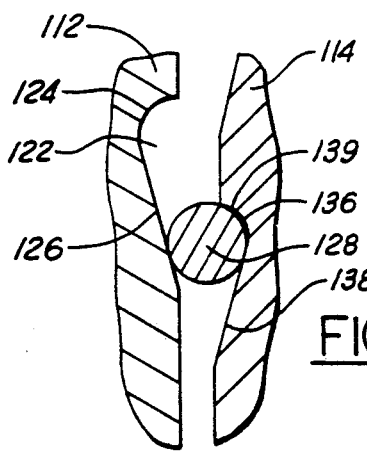
FIG. 12
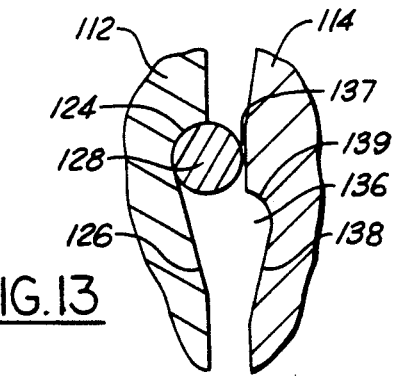
FIG. 13
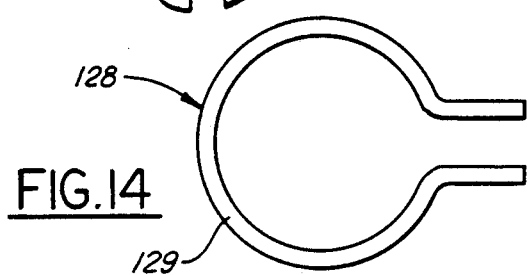
FIG. 14
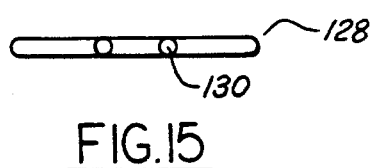
FIG. 15

VARIABLE LENGTH TELESCOPIC CONNECTOR AND METHOD FOR USE

TECHNICAL FIELD

This invention relates generally to telescopic connectors, and more particularly, to a telescopic connector having a male member, a female member, and a spring therebetween for controlling relative axial movement of the male and female members.

BACKGROUND ART

It is often desirable to adjust the distance from a floor to a suspended object. As an example, the suspended objects may include ventilation ducting, ceiling panels, electrical conduits, or sprinkler heads. Typically, these objects are suspended from the ceiling or other support members using threaded rods with nuts that are axially positioned along the rod to locate the suspended object.

One standard version of an adjustable length telescopic connector used in the fire sprinkler industry comprises an outer member having a threaded opening at one end for screwing onto a drop pipe, the drop pipe attaching to a support member such as a ceiling or a rafter, and at the other end having interior threads. An inner member having threads on its outer surface is then screwed into the outer member. By varying the amount of the inner member which is screwed into the outer member, the length of the connector may be varied. The lower end of the inner member is often threaded, interiorly or exteriorly, to accommodate connection with an object to be suspended such as a sprinkler head or the like.

Although this standard type of connection works satisfactorily, the close tolerances required for the threaded connection between the inner and outer members generally requires the connector to be assembled off site or the use on site of a skilled worker who must be taken from other jobs for a significant period of time. Further, if the threads become damaged or corroded, later repositioning requires reworking the threads.

DISCLOSURE OF INVENTION

The connector of the present invention includes a male member, which may be hollow in the event that fluid transport to the suspended object is desired, a female member in a telescopic relationship, a radial gap interposed between the members, and a spring, which functions as a lockring, with at least one release finger for expanding the spring. The release finger projects through an opening in the female member proximate where each of the members has a recess, the recesses cooperating such that when the release finger is manipulated to expand the spring, the spring will seat within the female recess wherein the remainder of the spring extending beyond the recess is not sufficient to bridge the radial gap between the telescoping members, but where the wire is seated in the male recess, the remaining portion of the spring outside the male recess extends a distance greater than the gap between the members, restricting relative axial movement between the male and female members. The male member may have helical threads along its outer periphery which threadingly cooperate with the unexpanded spring such that rotation of the female member and spring about the male member will result in relative axial movement between the members.

Accordingly, it is an object of the present invention to provide a hanger between a support member and a suspended object which provides two-way translation in adjusting the length therebetween, circumventing the need to translate one connector member the full length of travel relative to the other member prior to release in a second direction, as would be the case with a one-way ratcheting connector, such as is disclosed in copending and commonly assigned Ser. No. 414,109 filed Sept. 28, 1989.

Another object of the present invention is to provide an adjustable, force or weight bearing telescopic connector having a male member and a female member which are telescopically engageable with a gap therebetween which allows for relative axial movement. The telescopic connector also has an expandable spring located between the members. When expanded, the spring allows for relative axial movement between the members; when not expanded, the spring restricts relative axial movement. The spring has at least one release finger, which extends through an opening in the female member, operative to expand the spring. The female member further has a recess along its interior periphery for receiving the spring, the recess having a shoulder portion and at least one cam surface. When the spring is expanded the spring locates within the shoulder providing clearance between the spring and the male member. The male member has a series of recesses located along its outer periphery, each recess having at least one cam surface. When the spring is not expanded, the spring will wedge between the cam surfaces of the recess of the female member and one of the recesses of the male member, thus restricting relative axial movement and providing force bearing capability, in at least one direction.

Other objects, features, and advantages of the invention will become readily apparent from the following description and the accompanying drawings.

BRIEF DESCRIPTION OF DRAWINGS

FIG. 1 is a cross-sectional view, partly in elevation, illustrating the connector of the present invention wherein the male member has threads along its periphery;

FIG. 2 is a cross-sectional view taken along line 2—2 of FIG. 1, partly in elevation and with parts broken away, illustrating the spring in a contracted or non-expanded position engaging both the male and female members;

FIG. 3 is an enlarged partial sectional view taken along line 3—3 of FIG. 2 showing a radially inwardly projecting ridge portion, located on the inner diameter of the spring, engaging a recess formed between threads on the male member and showing a radially outwardly projecting bulbous portion of the spring engaging the cam surface of the recess of the female member, thus restricting downward axial movement of the female member relative to the male member.

FIG. 4 is a cross-sectional view taken along line 2—2 in FIG. 1 and with parts broken away to show the spring in elevation and wherein the release fingers of the spring are spread laterally apart expanding the spring, thus providing a radial gap between the spring and male member. In this position the female member is free to move axially upward or downward relative the male member;

FIG. 5 is an enlarged partial sectional view taken along line 5—5 in FIG. 4 wherein the spring has been The release fingers 30 are spread laterally apart expanding the engaging portion 29 until the bulbous portion 33 is seated in shoulder portion 24 of recess 22, as shown in FIG. 5. Next, female member 12 is placed over the male member 14 in a male-female relationship and adjusted axially upwardly.

Figure 16:
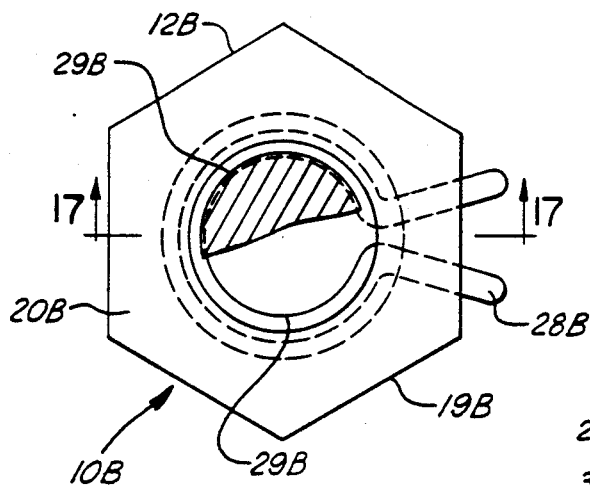

With the spring 22 seated in the shoulder portion 24, a radial gap 37 exists between the ridge portion 32 of spring 28 and threads 34 of male member 14. The female member 12 is adjusted axially upward and downward until ledge 20 is at the desired height. The release fingers 30 are then released allowing the engaging portion 29 to contract until the ridge portion 32 engages the desired recess 36 of the male member 14, as shown in FIG. 3. The female member 12 is then allowed to axially translate downwardly until the cam surface 26 traps the engaging portion 29 into recess 36. Hence, the female member 12 is restricted against downward axial translation relative to the male member 14.

To readjust the height, the female member 12 is translated axially upward in conjunction with the release fingers 30 being manipulated to expand the engaging portion 29 until the bulbous portion 33 is again seated in shoulder portion 24, reestablishing radial gap 37. The female member 12 is translated axially upwardly or downwardly as is desired, and again the release fingers 30 are released with the female member 12 being lowered until the engaging portion 29 is engaged between a cam surface 26 and a selected recess 36 of male member 14, as shown in FIG. 3.

With the spring 28 as shown in FIGS. 1-6, the release fingers 30 are spread laterally apart to expand the engaging portion 29 of spring 22. In FIGS. 7 and 8 an alternate variation (with similar components as described above being designated by the letter a) of the spring is shown wherein the release fingers 30a crossover one another such that expansion of the engaging portion 29a is accomplished by squeezing laterally together the release fingers 30a.

FIG. 9 shows a second embodiment, telescopic connection 110. In this embodiment, male member 114 has separate, longitudinally spaced positioning recesses 136. Female member 112 is connected to a drop pipe or other support means. As in the first embodiment of this invention, it is also possible to fixedly secure the male member 114, with the female member 112 moving axially relative to the male member 114. A suspended object will be attached to male member 114. (The drop pipe, support means, or the suspended object is not shown in FIG. 9.) The particular embodiment shown in FIG. 9 is capable of fluid transport, i.e. from a drop pipe through the female member 112 through the male member 114 to another device such as a sprinkler head.

Female member 112, as shown in FIGS. 12 and 13 has an annular recess 122 comprising a cam surface 126 and a shoulder portion 124. The shoulder portion 124 is more distal the telescopic end 121 of female 112 than is the cam surface 126. A rectangular opening 140 is located adjacent the recess 122 as seen in FIGS. 9-11. Recess 122 is located proximate the telescopic end of female member 112.

The male member 114, as shown in this particular embodiment, has a longitudinal passageway 116 for transporting fluid. Accordingly, proximate the telescopic end 118 of male member 114 are a pair of annular recesses 142 sized to cooperate with the inner diameter of female member 112 via elastic O-rings 144 to provide a fluid tight connection.

The male member 114 has a series of longitudinally spaced annular recesses 136 formed on its outer radial periphery. Each recess 136, as shown in FIGS. 12 and 13, has a shoulder portion 139 and a cam surface 138, the shoulder portion 139 being more proximate the telescopic end 118 of the male member 114 than the cam surface 138.

Spring 128, as best seen in FIGS. 14 and 15, has an arcuate engaging portion 129 terminating in two ends, each end connecting to release fingers 130. The release fingers 130 are laterally disposed from one another and cooperatively expand the engageable portion 129, which is preferably round in cross-section. The inner and outer diameters of the engageable portion 129, in an unexpanded state, are slightly less than the outer diameter of the male member 114 and slightly greater than the inner diameter of the female member 112. Hence, in the unexpanded state, the engaging portion 129 will seek to seat in shoulder portion 139 of recess 136 of male member 114, as shown in FIG. 12.

In operation, spring 128 is inserted into the telescopic end 121 of the female pipe 112 with the release fingers 130 passing through opening 140 and until the engaging portion 129 snaps into recess 122. The female member 112 is then connected to a drop pipe or support means, preferably for this embodiment, a drop pipe capable of delivering fluid to the female member 112.

Each of the O-rings 144 are placed in a recess 142 located on the telescopic end 118 of the male member 114. The release fingers 130 are then spread laterally causing the engaging portion 129 to expand, seating the engaging portion 129 within the shoulder portion 124 of recess 122 of female member 112 as shown in FIGS. 11 and 13.

The male member 114 is then inserted into the female member 112 in a male-female relationship. The O-rings 144 form a fluid-tight seal between the male and female members 112 and 114, respectively. FIG. 13 illustrates radial gap 137 which exists between the engaging portion 129 of spring 128 and the male member 114. The male member 114 is adjusted axially to the desired height and the release fingers 130 are released. Downward movement of male member 114 will cause the engaging portion 129 of spring 122 to wedge between the shoulder portion 139 of recess 136 and the cam surface 126 of recess 122, as seen in FIG. 12, preventing any further relative downward axially movement.

To readjust the male member 114 relative to female member 112, the male member 114 is translated axially upward slightly and the release fingers 130 are manipulated to expand the engaging portion 129 of spring 128, producing the radial gap 137 between the engaging portion 129 and the male member 114, allowing for two-way axial movement of the male member 114 relative to the female member 112. The male member 114 is moved axially to the desired new position, and release fingers 130 are released. Pulling downward on the male member 114 will again wedge male member 114 into a locked position relative to female member 112. It is also possible to simply push male member 114 upwards with respect to female member 112, with spring sliding past male member 112 as it resides within recess 122.

A device such as a sprinkler head, not shown, may be fluidly attached to the male member 114 to take advantage of the fluid transporting capability of this particular embodiment.

Figure 17:
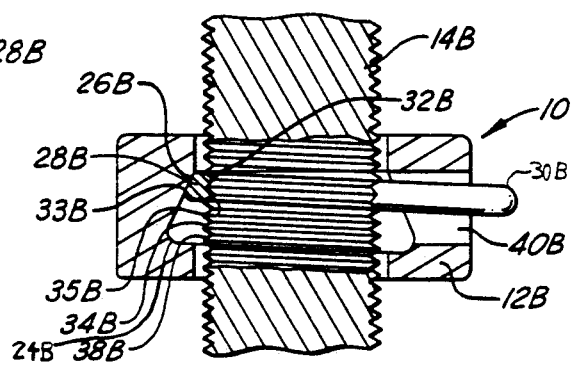
Figure 18:
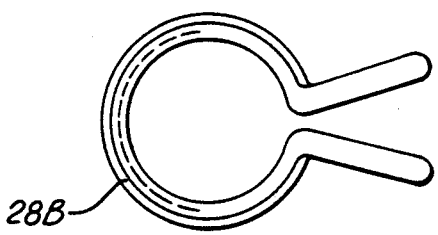

Another variation (with similar components as described above being designated by the letter B) of the first embodiment of the invention, i.e., an embodiment where the male member 14 has helical threads 34 about its outer periphery, is shown in FIGS. 16 and 17. Female member 12B may support weight or force on its upper surface and has a hexagonal outer periphery with flats 19B which are engageable with a wrench, not shown. Also, spring 28B has an arcuate engageable portion 29B which includes a pair of radially inwardly protruding ridge portions 32B and bulbous portion 33B which are configured, respectively, to threadingly engage cam surfaces 38B of threads 34B of male member 14B and to abut cam surface 26B of female member 12B when spring 28B is in its free or contracted state, preventing axial downward movement of female member 12B relative to male member 14B. Spring 28B is shown in FIG. 18.

In the event the suspended object, such as a ceiling, is supported on the top surfaces of a number of female members 12B, a particular telescopic connection 10B may, without lifting the suspended object therefrom, be adjusted. To lower, a wrench is placed on the peripheral flats 19B of female member 12B and turned such that it is threadedly lowered about male member 14B. The circumferential engagement of release fingers 30B against rectangular opening 40B will prevent spring 28B from rotating relative to female member 12B.

When sufficient clearance exists between the suspended object and the female member 12B, wherein the support is provided to the suspended object by other female members 12B, the engaging portion 29B is expanded, via release fingers 30B, into the shoulder portion 24B and the female member 12B may be freely lowered to a desired height. Release fingers 30B are then released allowing for reengagement of spring 28B with cam surfaces 38 on threads 34B of male member 14B and cam surface 26B of female member 12B. Accordingly, this procedure is repeated until all the female members are lowered to their desired heights.

Conversely, to raise the female members 12B, the female members 12B are threaded upwardly upon male member 14B to their desired heights. If the suspended object can be lifted from the upper surface of female member 12B, the engaging portion 29B may be expanded by release fingers 30B, into shoulder portion 24B and female member 12B lifted upwardly with release fingers 30B being released at the desired height.

Figure 19:
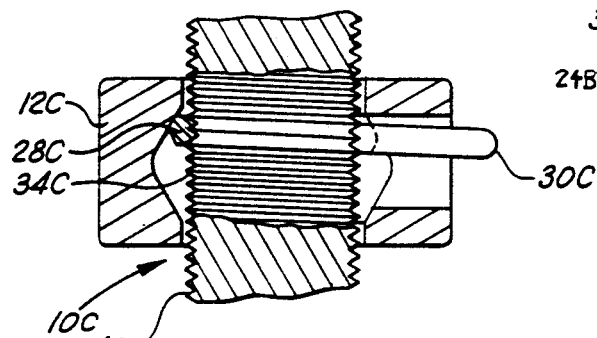
Figure 20:
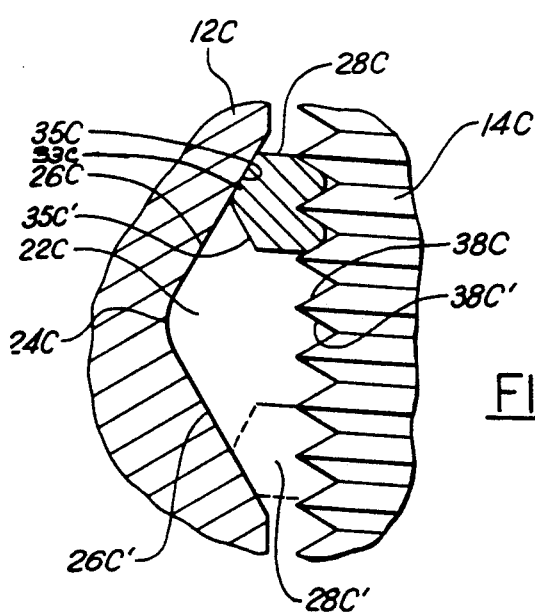

Another variation (with similar components being designated by the letter C), allowing for axially support by either the male or female member and in either direction is seen in FIG. 19 and 20. This variation is similar to the aforementioned variation B, except, in this case, recess 22C in female member 12C has first and second cam surfaces 26C and 26C', located above and below, respectively, shoulder portion 24C. Also, the bulbous portion 33C of spring 28C has first and second cam surfaces 35C and 35C' which are engageable with upper and lower cam surfaces 26C and 26C', respectively, when spring 28C is in its free state. In phantom, is shown spring 28C engaging the lower, second cam portion 26C' when the force is relatively either upwardly on the female member or downwardly on the male member. Similarly, threads 34C may be considered to have first and second cam surfaces 38C and 38C'.

The amount of axial "play" in this connection is limited by the axial distance separating one set of engaging cam surfaces, i.e. 26C and 35C or 26C' and 35C', when the other set of cam surfaces are engaged. Again, the female member 12C may be axially translated by threadedly rotating the female member 12C about the male member 14C, or else by expanding the engaging portion 29C into shoulder portion 24C and sliding female member 12C relatively to male member 14C. The functioning of release fingers 30C and engaging portion 29C are as described above.

Alternatively, as shown in FIG. 19, female member 12C and spring 28C may serve as a fastener. Male member 14C may be generally smooth with threads 34C cut-in along a mid-portion. Release fingers 30C are expanded, and female member 12C is slid over the smooth portion of male member 14C until female member 12C is positioned over threads 34C. The release fingers 30C are released with female member 12C restricted relative to male 14C. In the event female member 12C is used similarily to a nut and bolt connection, i.e., where an object (not shown) is to be clamped with support on one side provided by either the upper or lower surface of the female member 12C, female member 12C is rotated until spring 28C is firmly wedged between female member 12C and male member 14C. The rotating of female member 12C relative to male 14C, will put male member 14C under a pre-load, such as with a typical bolt and a nut connection, and will work with any version of this first embodiment, wherein the male member 14, 14C or 14C is threaded, thus preventing the connection 10 from vibrating loose.

The male and female members, as well as the spring, are preferably made of metal, although a plastic or other suitable material will also work in these embodiments. While the drawings show components that are circular in cross-section, these embodiments can also be used with male members, female members, and springs that are not circular in cross-section. This invention contemplates that either the male or female member may be fixedly secured with the other member moving axially relative thereto. By properly orientating the recesses on the members, this invention can restrict against relative axial movement either apart or together.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. An adjustable telescopic connector, adapted to be force responsive, comprising:
    a male member and a female member which are positionable in telescopic relation and configured to provide a gap therebetween sufficient to allow relative axial movement; and
    an expandable spring for selectively restricting said members against relative axial movement in response to force on one of said members in one axial direction and for releasing said members for relative axial movement to adjust the telescopic relation of said members, said spring having two ends and an engageable portion between said members, at least one of said ends connecting to a release finger, the release finger being operable to expand the engageable portion of the spring away from the male member;
    said female member having a recess in communication with said gap, the recess having a shoulder portion for sufficiently receiving the engageable portion of the spring such that the spring is free of said male member when the spring expands, and the recess further having a first female cam portion engageable with the spring when the spring is not expanded;

said female member further having an opening in communication with said recess, the opening being sufficient to accommodate the release finger when it operates to expand the engageable portion of the spring;

said male member having a plurality of positioning recesses axially alignable with the recess in said female member, each of said positioning recesses having a first male cam portion engageable with the spring when the spring is not expanded;

said engageable portion of the spring engaging the female cam portion and the male cam portion of at least one of said plurality of positioning recesses to restrict said members against relative axial movement when the spring is not expanded, and said engageable portion being received in the shoulder of the recess of said female member to release said members for relative axial movement when the spring is sufficiently expanded.

2. The telescopic connector of claim 1 wherein the male member includes an axial passageway throughout its length.

3. The telescopic connector of claim 2 further comprising a sealing means for forming a fluid tight seal between the male member and the female member.

4. The telescopic connector of claim 3 wherein said sealing means includes an O-ring seal retained in a groove formed in the outer periphery of the male member, said O-ring sealingly cooperating with the interior periphery of the female member.

5. The telescopic connector of claim 4 wherein the male and the female members are circular in cross-section, with the engageable portion of the spring being arcuate.

6. The telescopic connector of claim 1 wherein the plurality of positioning recesses on the male member are separate, longitudinally spaced recesses.

7. The telescopic connector of claim 6 wherein the recesses of the male and female members each have a second male and female cam portion, respectively, which cooperate with the engageable portion of the spring when the engageable portion is not expanded to restrict relative axial movement in a direction opposite to that opposed by their first male and female cam portions.

8. The telescopic connector of claim 1 wherein said plurality of positioning recesses are formed by a thread on said male member and the engageable portion of the spring comprises at least one ridge portion mating with at least one said positioning recesses when the engageable portion of the spring is not expanded.

9. The telescopic connector of claim 8 wherein when the engageable portion of the spring is not expanded, the female member and the spring are rotatable relative to the threads of the male member causing relative axial movement between the members.

10. The telescopic connector of claim 9 wherein the outer periphery of the female member has flats which are configured to be received within a wrench, for rotating the female member.

11. The telescopic connector of claim 6 or 8 having two release fingers wherein the release fingers do not cross over one another such that the release fingers are displaced laterally apart to expand the engageable portion of the spring finger.

12. The telescopic connector of claim 1 wherein the recesses of the male and female members each have a second male and female cam portion, respectively, which cooperate with the engageable portion of the spring when the engageable portion is not expanded to restrict relative axial movement in a direction opposite to that opposed by their first male and female cam portions.

13. An adjustable, force-bearing telescopic connector comprising:

a male member and a female member having respective ends which are positionable in telescopic relation and configured to provide a gap therebetween sufficient to allow limited axial movement; and an expandable spring for selectively restricting said members against relative axial movement in one direction in response to force on one said member in one axial direction and for releasing said members for relative axial movement to adjust the telescopic relation of said members, said spring having two ends and an engageable portion between said members, each end configured to provide a release finger, the release fingers being cooperative to expand the engageable portion of the spring away from the male member;

said female member having a recess in communication with said gap, said recess having a shoulder portion for sufficiently receiving the engageable portion of the spring to be free of said male member when the spring is expanded and a female cam portion engageable with the spring when the spring is not expanded;

the female member further having an opening in communication with said recess, the opening being sufficient to accommodate the release fingers to expand the engageable portion of the spring away from the male member;

said male member having a plurality of positioning recesses axially alignable with the recess in said female member, each positioning recess having a male cam portion engageable with the spring and a shoulder portion for insufficiently receiving the engageable portion of the spring to be free of said female member when the spring is not expanded;

said engageable portion of the spring engaging male and female cam portions to restrict said male and female members against relative axial movement when the spring is not expanded, and said engageable portion being received in the recess of said female female member to release said members for relative axial movement when the spring is expanded.

14. An adjustable, force-bearing fastener adapted for attachment to a pipe or the like having a plurality of recesses or the like along its length, said fastener comprising:

a female member positionable on said pipe or the like and configured to provide a gap therebetween sufficient to allow limited axial movement with respect to said pipe or the like when positioned thereon and a recess adapted to be in communication with said gap; and an expandable spring for selectively restricting said female member against axial movement relative to said pipe or the like in one axial direction and for releasing said female member for axial movement relative to said pipe or the like to adjust the position of said female member along said pipe or the like, said spring having two ends and an engageable portion, at least one of said ends configured to provide a release finger, the release finger being operable to expand the engageable portion of the spring away from the pipe or the like when the female member is positioned thereon;

said recess having a shoulder portion for sufficiently receiving the engageable portion of the spring to be free of said pipe or the like when the spring is expanded and a female cam portion engageable with the spring when the spring is not expanded;

the female member further having an opening in communication with said recess, the opening being sufficient to accommodate the release finger to expand the engageable portion of the spring away from the pipe or the like when positioned thereon;

said engageable portion of the spring engaging the female cam portion to restrict said female member against axial movement relative to said pipe or the like when the spring is not expanded, and said engageable portion being received in the recess of said female member to release said female member for axial movement relative to said pipe or the like when the spring is expanded.

15. The fastener of claim 14 wherein the engageable portion is a thread conforming ridge.

16. The fastener of claim 14 wherein the outer periphery of said female member is a hexagon.

* * * * *